United States Patent [19]

Yamaguchi et al.

[11] Patent Number: 4,504,651
[45] Date of Patent: Mar. 12, 1985

[54] SULFUR-CONTAINING POLYESTER AND PROCESS FOR ITS PRODUCTION

[75] Inventors: Toyohiko Yamaguchi; Koichi Kashima; Minoru Ozutsumi; Masaru Morinaga, all of Tokyo, Japan

[73] Assignees: Hodogaya Chemical Co., Ltd.; Katsura Sangyo Co., Ltd., both of Tokyo, Japan

[21] Appl. No.: 554,248

[22] Filed: Nov. 22, 1983

[30] Foreign Application Priority Data

Dec. 3, 1982 [JP] Japan .................................. 57-211392
Mar. 10, 1983 [JP] Japan .................................. 58-38192

[51] Int. Cl.$^3$ .............................................. C08G 75/26
[52] U.S. Cl. .................................... 528/360; 524/302; 525/23; 560/147
[58] Field of Search .................. 528/360; 560/147; 525/23; 524/302

[56] References Cited

U.S. PATENT DOCUMENTS 3,475,389 10/1969 Jones .................................. 528/360

Primary Examiner—Harold D. Anderson
Attorney, Agent, or Firm—Oblon, Fisher, Spivak, McClelland & Maier

[57] ABSTRACT

A sulfur-containing polymer having a repeating unit represented by the formula:

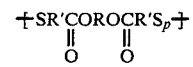

where R is a straight or branched alkylene group having from 1 to 6 carbon atoms, R' is a straight or branched alkylene group having from 1 to 3 carbon atoms and p is an integer of from 0 to 10, and having an average molecular weight of from 500 to 10,000 and a sulfur content of from 15 to 65% by weight. The sulfur-containing polymer of the present invention is useful as a flame or smoke retarding agent in resin and rubber materials.

13 Claims, 5 Drawing Figures

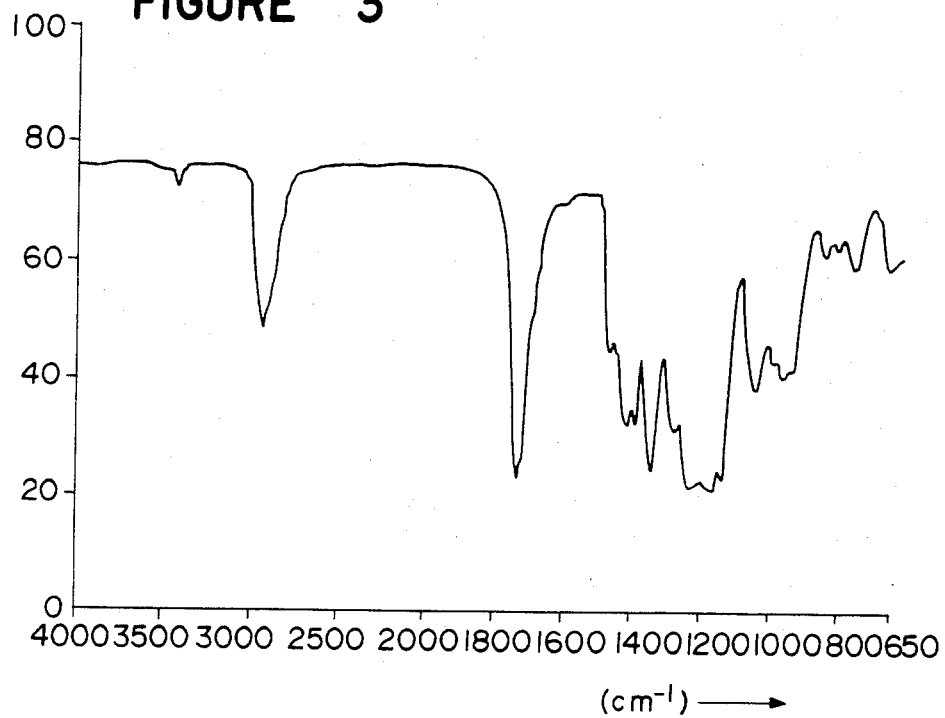
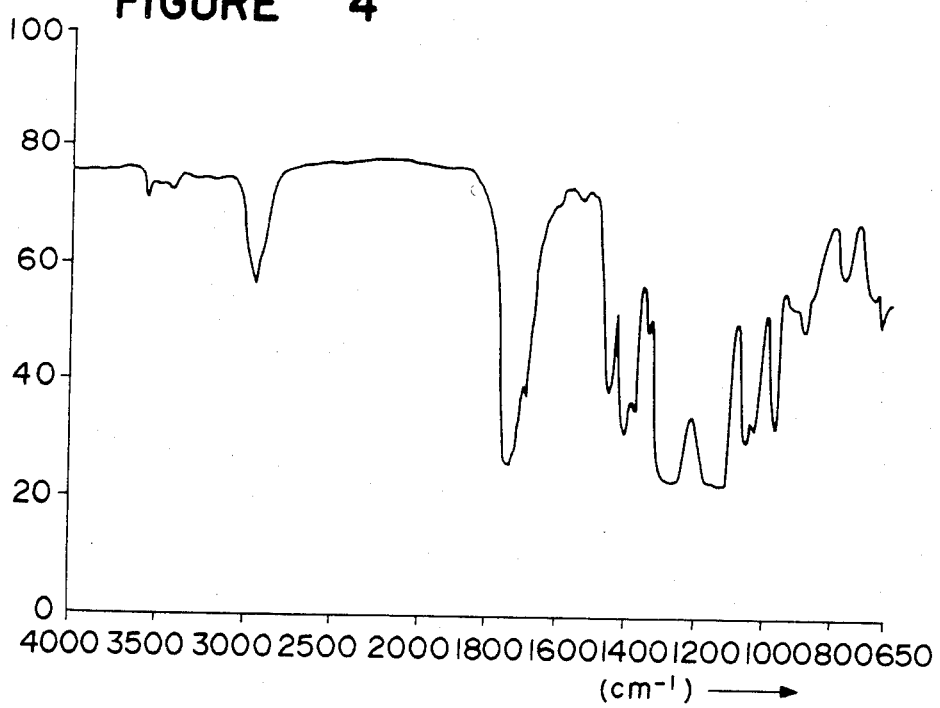

SULFUR-CONTAINING POLYESTER AND PROCESS FOR ITS PRODUCTION

The present invention relates to a sulfur-containing polymer, and particularly to a sulfur-containing polymer which is suitable for use as a flame or smoke retardant to impart a flame or smoke retardancy to e.g. a thermosetting resin, a thermoplastic resin or rubber, as a hardener and/or a plasticizer for e.g. an epoxy resin and as a weatherability improver to impart weatherability to e.g. a urethane resin. The present invention also relates to a process for producing such a sulfur-containing polymer, and particularly to a process for producing a sulfur-containing polymer by reacting a dimercaptocarboxylic acid ester, or a dimercaptocarboxylic acid ester and a polymercaptocarboxylic acid ester, with sulfur in the presence of a nitrogen-containing compound catalyst.

As sulfur-containing polymers, there have been known thiokol as liquid rubber and PM polymer as a liquid polymer for an elastic sealant. The former is a kind of a polysulfide polymer obtainable by reacting an organic compound having chlorine atoms at both terminals with an alkali metal polysulfide and thus has terminal mercapto groups, whereby the terminal mercapto groups can be oxidized by various oxidizing agent to form a high molecular weight polymer with S—S bonds. It is used as an architectural sealing agent for e.g. high buildings. The latter is a polyester obtained by reacting a polyol with a mixture of a mercaptoalkanoic acid and a thiodialkanoic acid obtained from the reaction of acrylonitrile, etc. with sulfur, as disclosed in e.g. Japanese Examined Patent Publication No. 34677/1977. It has terminal mercapto groups and can be cured by a vulcanizing agent to obtain an elastic solid product, which is useful as an architectural sealing agent.

As a result of extensive researches to develop a new sulfur-containing polymer, the present inventors have found a novel sulfur-containing polymer which can be obtained by reacting a certain dimercaptocarboxylic acid ester with sulfur in the presence of a nitrogen-containing compound catalyst.

Namely, the present invention provides a sulfur-containing polymer having a repeating unit represented by the formula

 (I)

where R is a straight or branched alkylene group having from 1 to 6 carbon atoms, R' is a straight or branched alkylene group having from 1 to 3 carbon atoms and p is an integer of from 0 to 10, and having an average molecular weight of from 500 to 10,000 and a sulfur content of from 15 to 65% by weight.

Further, the present invention provides a flame or smoke retardant comprising the above sulfur-containing polymer.

It has been found also that the novel sulfur-containing polymer can readily be prepared by reacting a certain dimercaptocarboxylic acid ester, or such an ester and a certain polymercaptocarboxylic acid ester, with sulfur in the presence of a nitrogen-containing compound catalyst.

Namely, the present invention also provides a process for producing a sulfur-containing polymer, which comprises reacting at least one member selected from the group consisting of dimercaptocarboxylic acid esters represented by the formula:

 (II)

where R is a straight or branched alkylene group having from 1 to 6 carbon atoms, and R' is a straight or branched alkylene group having from 1 to 3 carbon atoms, with sulfur in the presence of at least one nitrogen-containing compound catalyst selected from the group consisting of compounds having an amino group, a substituted amino group and a nitrogen-containing hetero ring.

Further, the present invention provides a process for producing a sulfur-containing polymer, which comprises reacting at least one member selected from the group consisting of dimercaptocarboxylic acid esters represented by the formula:

 (II)

where R is a straight or branched alkylene group having from 1 to 6 carbon atoms, and R' is a straight and branched alkylene group having from 1 to 3 carbon atoms, and at least one member selected from the group consisting of polymercaptocarboxylic acid esters represented by the formula:

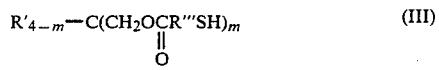 (III)

where R" is a hydrogen atom, a methyl group or an ethyl group, R''' is a straight or branched alkylene group having from 1 to 3 carbon atoms, and m is an integer of 3 or 4, with sulfur in the presence of at least one nitrogen-containing compound catalyst selected from the group consisting of compounds having an amino group, a substituted amino group and a nitrogen-containing hetero ring.

Now, the present invention will be described in detail with reference to the preferred embodiments.

In the accompanying drawings, FIG. 1 is a chart of the IR spectrum of the polymer prepared in Example 1.

FIG. 3 is a chart of the IR spectrum of the polymer prepared in Example 4.

FIG. 4 is a chart of the IR spectrum of the polymer prepared in Example 5.

Figure 1:
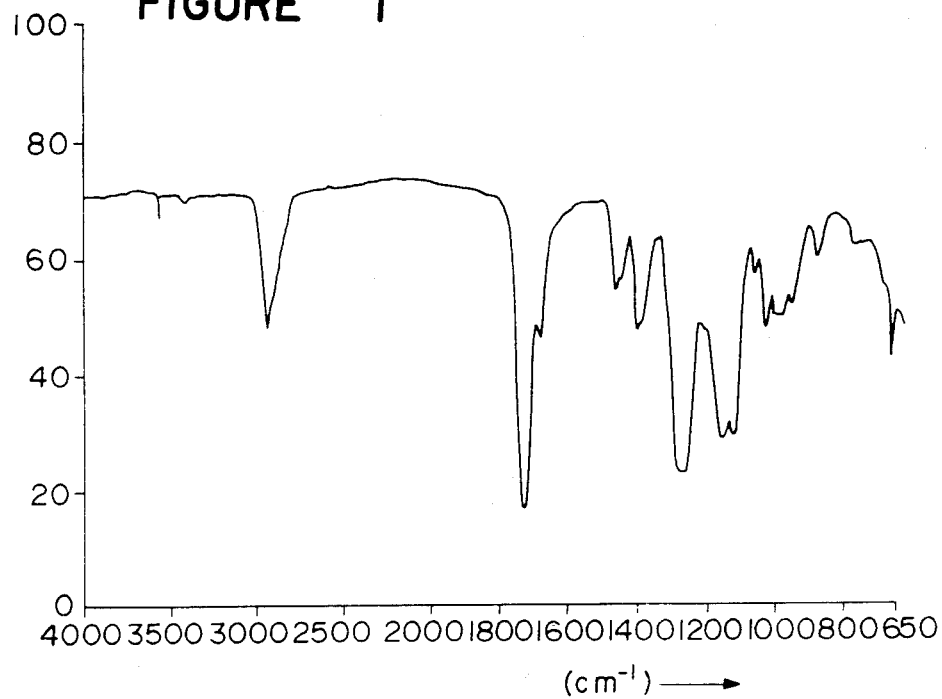

Now, the process of the present invention will be described.

The dimercaptocarboxylic acid ester of the formula II to be used in the process of the present invention can readily be prepared by the esterification reaction of the corresponding mercaptocarboxylic acid with a diol. For instance, a mercaptocarboxylic acid such as thioglycollic acid, α-mercaptopropionic acid, β-mercaptopropionic acid or α-mercapto-α-methylpropionic acid and a diol such as ethylene glycol, propylene glycol, 1,3-butylene glycol, 2,3-butylene glycol, 1,4-butylene glycol or 1,6-hexane diol, may be reacted in accordance with a conventional method, for instance, by heating and stirring in the presence of a small amount of p-toluenesulfonic acid, to form the dimercaptocarboxylic acid ester of the formula II.

The polymercaptocarboxylic acid ester of the formula III to be used in the process of the present invention can be prepared by the esterification reaction of the above-mentioned mercaptocarboxylic acid with an aliphatic polyol such as trimethylolpropane or pentaerythritol in the same manner as above.

In the process of the present invention, as the sulfur to be reacted with the compound of the formula II or with the compounds of the formulas II and III, there may be used solid sulfur such as sublimated sulfur, precipitated sulfur, refined sulfur or colloidal sulfur, or liquid sulfur. However, it is particularly preferred to use powdery sulfur.

The sulfur is used in such an amount that the ratio of S/SH is from 0.1 to 9.0, preferably from 0.4 to 5.0, where S is the number of sulfur atoms and SH is the number of SH groups in the above-mentioned compound of the formula II. If the amount of the sulfur is too small, the flame or smoke retarding properties of the resulting polymer tend to be decreased. On the other hand, if the amount of the sulfur is excessive, it is likely that sulfur precipitates, and the reaction product tends to be non-uniform whereby the handling will be difficult, and if the remaining sulfur is substantial, it is likely that a resin to which this sulfur-containing polymer is incorporated, becomes hardly hardenable.

When the compound of the formula II and the compound of the formula III are used in combination, the compound of the formula III is used usually in an amount of at most 0.10 mol, preferably at most 0.03 mol relative to 1 mol of the compound of the formula II. If the amount of the compound of the formula III is excessive, the viscosity of the resulting polymer tends to be too high, whereby the operation will be difficult.

As the nitrogen-containing compound catalyst which may be used in the process of the present invention, there may be mentioned compounds having an amino group, a substituted amino group or a nitrogen-containing hetero ring. Specifically, there may be mentioned urea or thiourea derivatives such as N,N'-diphenylthiourea, N,N'-diethylthiourea, N,N'-dilaurylthiourea, tetramethylthiuram disulfide, tetraethylthiuram disulfide, tetrabutylthiuram disulfide, dipentamethylenethiuram tetrasulfide, urea or 1,3-diphenyl-2-thiourea; nitrogen-containing hetero cyclic compounds such as hexamethylene tetramine, 2-mercapto-2-imidazoline, 2-mercaptobenzothiazole, dibenzothiazyl disulfide, a 2-mercaptobenzothiazole cyclohexylamine salt, 2-(4'-morpholinodithio)benzothiazole, N-cyclohexyl-2-benzothiazolyl sulfene amide, N-oxydiethylene-2-benzothiazolyl sulfene amide, N-t-butyl-2-benzothiazolyl sulfene amide, poly-(2,2,4)-trimethyl-1,2-dihydroxyquinoline, 2-mercaptobenzimidazole, quinoline, 2-aminobenzothiazole, aminotriazole, pyridine or morpholine; guanidines such as guanidine, dicyandiamide, aminoguanidine, 1,3-diphenylguanidine, 1,2,3-triphenylguanidine, di-o-tolylguanidine or a di-o-tolylguanidine salt of dicatechol borate; thiocarbamates such as piperidine pentamethylenedithiocarbamate, pipecoline pipecolyldithiocarbamate, zinc dimethyldithiocarbamate, a diethylthiocarbamate, a dibutyldithiocarbamate or a N-ethyl-N-phenyldithiocarbamate; diaryl amines such as diphenyl amine, dimethyl aminodiphenyl amine, N,N'-diphenyl-p-phenylenediamine, N-phenyl-N'-isopropyl-p-phenylenediamine, 1-(N-phenylamino)-naphthalene, a reaction product of diphenyl amine and acetone or p-aminodiphenylamine; anilines such as aniline, a monoalkylaniline, a dialkylaniline, toluidine, a monoalkyltoluidine, a dialkyltoluidine or a condensation product of n-butylaldehyde and aniline; aliphatic primary amines such as ethyl amine, propyl amine or butyl amine; aliphatic secondary amines such as diethyl amine or dibutyl amine; aliphatic tertiary amines such as triethyl amine, tripropyl amine; alicyclic amines such as cyclobutyl amine or cyclohexyl amine; diamines such as ethylene diamine; substituted alkyl diamines such as N,N-diethylethylenediamine; triamines such as diethylenetriamine or a substituted alkyl triamine; polyamines such as triethylenetetramine or a substituted alkyl polyamine; oxyalkylene amines such as ethanol amine; compounds having an aziridinyl group in which a part of the above amino groups is substituted by ethylene imine; or other nitrogen-containing compounds such as dimethylformamide. In the presence of such a catalyst, the reaction proceeds even at a relatively low temperature to form a desired sulfur-containing polymer. The amount of the catalyst is not critical. However, if the amount is too small, no adequate effectiveness for the promotion of the reaction will be obtained. On the other hand, if the amount is excessive, it is likely that the reaction becomes vigorous or the physical properties of the resulting polymer tend to be deteriorated. Accordingly, the catalyst is used usually in an amount of from 0.01 to 30% by weight, preferably from 0.05 to 5% by weight, relative to the weight of the starting material ester, although the amount varies depending upon the type of the catalyst.

The reaction of the compound of the formula II or the compounds formulas II and III with sulfur may be conducted, for instance, in the following manner.

The dimercaptocarboxylic ester monomer prepared in the above-mentioned method, or such a monomer and a polymercaptocarboxylic acid ester monomer (crosslinking agent) are dissolved in a proper solvent, if necessary, and then the above-mentioned catalyst is added thereto and thoroughly mixed at normal temperature. A solvent may be used, for instance, for adjusting the viscosity of the resulting polymer solution. Specifically, aromatic hydrocarbons such as toluene, o-xylene, m-xylene, mixed xylene, ethylbenzene or cumene may be suitably used. Then, sulfur is gradually added to the catalyst-containing monomer solution under stirring. The reaction temperature is not critical. However, foaming is likely to take place due to hydrogen sulfide gas generated by the reaction. Therefore, it is usually preferred to conduct the reaction at a temperature of from 20° to 80° C. By using the above-mentioned nitrogen-containing compound catalyst, it is possible to smoothly carry out the reaction even at normal temperature. After the completion of the addition of sulfur, the reaction solution is eventually heated to a temperature of at least 120° C., depending upon the type of the catalyst, to drive out hydrogen sulfide gas dissolved in the reaction solution and to eliminate the odour of the resulting polymer. The completion of the reaction can be ascertained by the termination of the generation of hydrogen sulfide gas. As an alternative method, it is possible to obtain a desired polymer by preliminarily suspending sulfur in a solvent and adding to the suspension a compound of the formula II or compounds of the formulas II and III under stirring. Also in this case, the reaction is preferably conducted while controlling the temperature and the rate of addition of the compound of the formula II or the compounds of the formulas II and III. In the case where a substantial amount of residual sulfur remains upon the completion of the reaction, it is preferred to remove the sulfur by e.g. extraction.

From the infrared absorption spectrum analysis, GPC analysis, elemental analysis and proton NMR analysis as will be described in the following Examples, the sulfur-containing polymer of the present invention prepared from the compound of the formula II in accordance with the above-mentioned method, was found to be a sulfur-containing polymer having the above-mentioned repeating unit of the formula I. When the compound of the formula III is used in combination with the compound of the formula II, the resulting polymer will have various structures in which the compound of the formula III is crosslinked to the sulfur atom in the repeating unit of the formula I.

The sulfur-containing polymer having the above-mentioned repeating unit of the formula I according to the present invention, has a molecular weight of from 500 to 10000, preferably from 600 to 5000 and a sulfur content of from 15 to 65% by weight, preferably from 20 to 45% by weight. The molecular weight is the one determined by the Gel Permeation Chromatography, (GPC), analysis, and the sulfur content was determined by the elemental analysis.

Such polymers are novel, and may be suitably used, for instance, as a flame or smoke retardant to impart flame or smoke retardancy to e.g. a thermosetting resin, a thermoplastic resin or a rubber, as a hardening agent and/or a plasticizer for an epoxy resin, etc., and as a weatherability improver to impart weatherability to a urethane resin, etc.

Now, the present invention will be described in further detail with reference to Examples. However, it should be understood that the present invention is by no means restricted by these specific Examples. In the following Examples, "parts" and "%" means "parts by weight" and "% by weight", respectively, unless otherwise specified. The yield was calculated on the basis of the reaction represented by the following formula, and the value after the removal of hydrogen sulfide was taken as 100%.

(II)+2S→(I)+H$_2$S

EXAMPLE 1

Into a 2 liter four-necked separatory flask provided with a thermometer, a gas outlet, a stirrer and a sulfur inlet, 1124.6 g (4.30 mol) of 1,4-butanedioldithioglycolate (hereinafter referred to simply as BDTG) having a purity of 91.0% and 4.5 g of diphenyl guanidine were fed, and while stirring the mixture, 289.7 g (8.60 g atom) of sulfur powder having a purity of 95% was gradually added in 160 minutes at a temperature of 22° C. Vigorous foaming was observed due to the generation of hydrogen sulfide gas. The temperature dropped to 17° C., and the stirring was continued at the same temperature for further 30 minutes. Then, while continuing the stirring, the temperature was gradually raised to 130° C. in 120 minutes, and the stirring was continued at the same temperature for 3 hours. The generation of hydrogen sulfide gas terminated, and no substantial foaming was observed, whereby 1273.5 g (yield: 100.1%) of a viscous yellow polymer was obtained.

The IR spectrum of the polymer thus obtained was as shown in FIG. 1. As shown in FIG. 1, the absorption attributable to the methylene group was observed at 2950 cm$^{-1}$ and 1470 cm$^{-1}$. No substantial absorption at 2570 cm$^{-1}$ attributable to the SH group was observed. Further, a great absorption attributable to the ester group was observed at 1730 cm$^{-1}$.

Further, the number of sulfur bonds were analyzed from the proton NMR in the same process as disclosed in J. Org. Chem. 31, 601-2 (1966), whereby the following results were obtained:
—S$_2$—40%
—S$_3$—26%
—S$_4$—17%
—S$_{5 \, or \, higher}$—17%

The average of the S$_{p+1}$ bonds was 3.1. Thus, the average number of p in the formula I is 2.1. Further, from the GPC analysis, the residual sulfur was found to be minimum.

The average molecular weight of the polymer thus obtained was 2000 (as obtained by preparing a calibration curve of each molecular weight polymer obtained by GPC and calculating from the surface area ratio of the respective molecular weight polymers from the chart thus prepared). The sulfur content as measured by the elemental analysis was 32.5%.

From the above results, it was found that no substantial mercapto groups were present in the polymer thus obtained (see the IR analysis), and the average number of the repeating units calculated from the above average molecular weight was 7.5. Accordingly, it is considered that the polymer is composed mainly of the one wherein the repeating units of the formula I are linked in the form of a ring.

EXAMPLE 2

Figure 2:
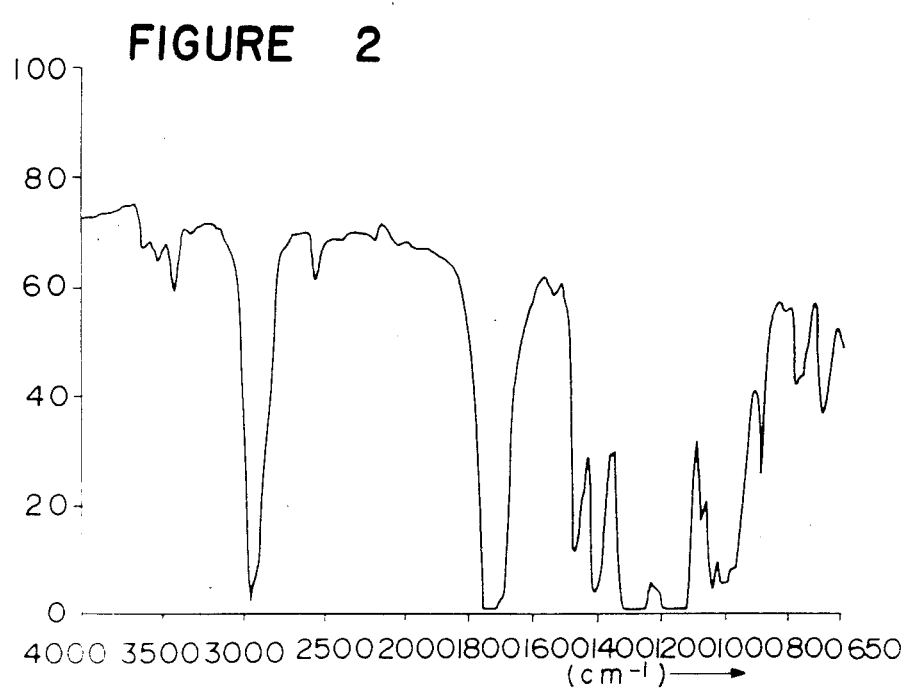
FIG. 2 is a chart of the IR spectrum of the polymer prepared in Example 2.

1177 g (4.50 mol) of BDTG having a purity of 91.0% was reacted with sulfur in the presence of 4.7 g of diphenylguanidine i.n the same manner as in Example 1. The amount of the sulfur powder having a purity of 95% was 152 g (4.50 g atom), and the time for the addition of the sulfur was 60 minutes. Thus, 1194 g (yield: 101.1%) of a yellow viscous polymer was obtained. The polymer thus obtained had an average molecular weight of 2900 and a sulfur content of 24.2%. In the same manner as in Example 1, this polymer was confirmed to be a sulfur-containing polymer having an average value of p=1.4 including a polymer of p=0 in the repeating unit of the formula I. From the GPC analysis, it was confirmed that no residual sulfur was present, and all sulfur was reacted. From the IR spectrum in FIG. 2, the presence of SH groups was observed. Thus, the polymer was found to be composed mainly of a straight chain polymer comprising 11 repeating units of the formula I in an average.

EXAMPLE 3

150 g (0.574 mol) of BDTG having a purity of 91.0% was reacted with sulfur powder in the presence of 4.8 g of diphenylguanidine in the same manner as in Example 1. The amount of the sulfur having a purity of 95% was 174 g (5.16 g atom), and the time for the addition of the sulfur was 120 minutes. Thus, 304.2 g (yield: 99.7%) of a viscous liquid polymer was obtained. The polymer thus obtained had an average molecular weight of 670 and a sulfur content of 60.5%. In the same manner as in Example 1, this polymer was confirmed to be a sulfur-containing polymer having an average value of p=2.5 in the repeating unit of the formula I. From the IR analysis, it was found that no SH group was present. From the GPC analysis, the polymer was found to contain a substantial amount of sulfur.

EXAMPLE 4

1194 g (4.30 mol) of 1,4-butanediol-di-$\beta$-mercaptopropionate (BDMP) having a purity of 95.8% was reacted with sulfur in the presence of 4.8 g of diphenylguanidine in the same manner as in Example 1. The amount of the sulfur powder having a purity of 95% was 289.7 g (8.6 g atom), and the time for the addition of the sulfur was 90 minutes. Thus, 1137 g (yield: 99.6%) of a yellow viscous liquid polymer was obtained. The polymer thus obtained had an average molecular weight of 2200 and a sulfur content of 31.2%. In the same manner as in Example 1, this polymer was confirmed to be a sulfur-containing polymer having an average value of p=2.1 in the repeating unit of the formula I. The IR spectrum of this polymer is shown in FIG. 3.

EXAMPLE 5

1028 g (4.30 mol) of ethylene glycol dithioglycolate (EGTG) having a purity of 87.8% was reacted with sulfur powder in the presence of 4.1 g of diphenylguanidine in the same manner as in Example 1. The amount of the sulfur having a purity of 95% was 289.7 g (8.6 g atom), and the time for addition of the sulfur was 90 minutes.

Thus, 1175 g (yield: 100.1%) of a viscous liquid polymer was obtained. The polymer thus obtained had an average molecular weight of 1800 and a sulfur content of 35.3%. In the same manner as in Example 1, this polymer was confirmed to be a sulfur-containing polymer having an average value of p=2.1 in the repeating unit of the formula I. The IR spectrum of this polymer is shown in FIG. 4.

EXAMPLE 6

Figure 5:
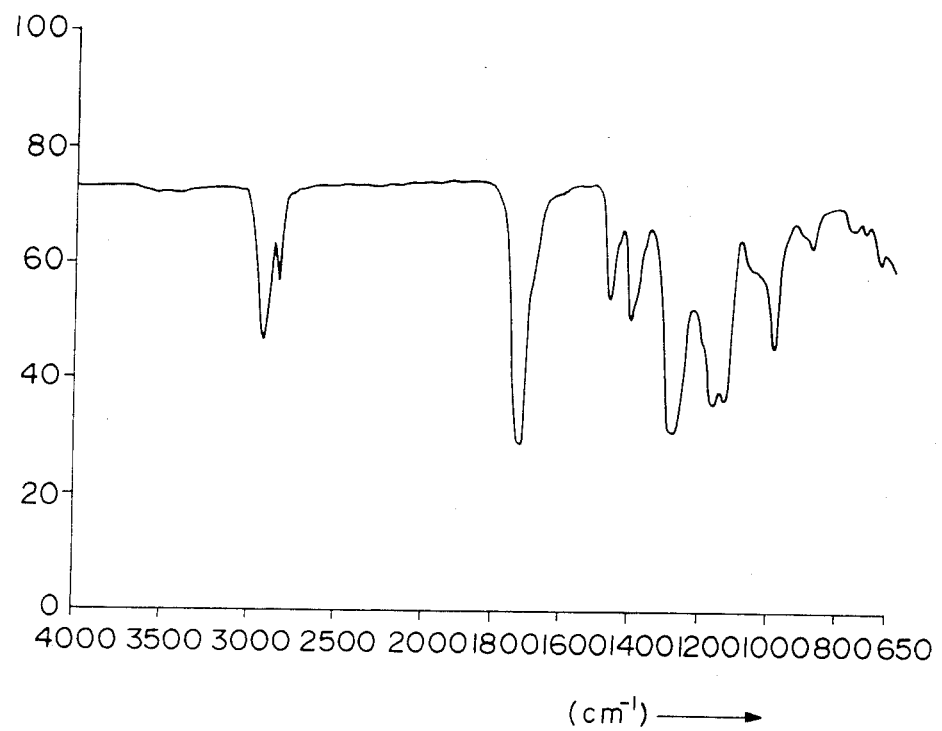
FIG. 5 is a chart of the IR spectrum of the polymer prepared in Example 6.

1205 g (4.3 mol) of 1,6-hexanedioldithioglycolate (HDTG) having a purity of 94.9% was reacted with sulfur in the presence of 4.1 g of diphenylguanidine in the same manner as in Example 1. The amount of the sulfur powder having a purity of 95% was 289.7 g (8.6 g atom), and the time for the addition of the sulfur was 90 minutes. Thus, 1344 g (yield: 99.3%) of a yellow viscous liquid polymer was obtained. The polymer thus obtained had an average molecular weight of 2200 and a sulfur content of 31.0%. In the same manner as in Example 1, this polymer was confirmed to be a sulfur-containing polymer having an average value of p=2.1 in the repeating unit of the formula I. The IR spectrum of the polymer is shown in FIG. 5.

EXAMPLE 7

1077 g (4.30 mol) of ethylene glycol-di-$\beta$-mercaptopropionate (EGMP) having a purity of 95.2% was reacted with sulfur powder in the presence of 4.3 g of diphenylguanidine in the same manner as in Example 1. The amount of the sulfur having a purity of 95% was 289.7 g (8.6 g atom), and the time for the addition of the sulfur was 90 minutes.

Thus, 1215 g (yield: 99.2%) of a viscous liquid polymer was obtained. The polymer thus obtained had an average molecular weight of 2000 and a sulfur content of 34.1%. In the same manner as in Example 1, this polymer was confirmed to be a sulfur-containing polymer having an average value of p=2.1 in the repeating unit of the formula I.

EXAMPLES 8 to 10 and COMPARATIVE EXAMPLES 1 to 3

Each of the sulfur-containing polymers obtained in the above Examples, PM polymers (manufactured by Phillips Petroleum Co.) as commercially available sulfur-containing polymers, and thiokol LP 32 (manufactured by Toray Thiokol Co. Ltd.) was incorporated into a commercially available unsaturated polyester (Rigolac 158 BQT manufactured by Showa Highpolymer Co., Ltd.) to obtain the following composition.

TABLE 1

| Composition | Parts |
| --- | --- |
| Unsaturated polyester | 100 |
| Sulfur-containing polymer | 5 |
| Curing agent *1 | 2 |
| Aluminum hydroxid | 20 |
| Calcium carbonate | 40 |
| Glass fiber | 50 |
| Hexabromobenzene | 20 |

*1 Sanperox-TB manufactured by Sanken Chemical Co., Ltd.

The compositions thus obtained were cured at a temperature of 140° C. for 80 minutes in accordance with a conventional method, and the cured resin products thus obtained were subjected to flammability tests (the flammability was determined by the oxygen concentration at which the fire was extinguished in 180 seconds after catching fire) and smoke retardancy tests (the degree of the smoke was determined by the extinction coefficient per weight loss by the combustion). The test results are shown in the following Table 2.

TABLE 2

| No. | Sulfur-containing polymer | Oxygen concentration | Extinction coefficient |
| --- | --- | --- | --- |
| Example 8 | Example 1 | 34.9% | 0.38 |
| Example 9 | Example 2 | 33.8 | 0.48 |
| Example 10 | Example 6 | 35.1 | 0.37 |
| Comparative Example 1 | Nil | 32.9 | 0.68 |
| Comparative Example 2 | PM polymer | 32.9 | 0.60 |
| Comparative Example 3 | Thiokol LP32 | 32.5 | 0.61 |

It is evident from the above Table 2 that the resin composition containing the sulfur-containing polymers exhibited remarkable fire and smoke retardancy.

EXAMPLE 11

Into a 2 liter four-necked separatory flask provided with a thermometer, a gas outlet, a stirrer and a sulfur inlet, 192 parts of EGTG, 835 parts of BDTG, 26.4 parts of pentaerythritol-tetrakis-$\beta$-mercaptopropionate (hereinafter referred to simply as PTMP) 136 parts of mixed xylene and 4.4 parts of n-butylamine, were fed. While stirring the mixture, 283 parts of sulfur powder was gradually added in 90 minutes at a temperature of 31° C. Due to the generation of hydrogen sulfide gas, vigorous foaming was observed. The temperature dropped to 21° C., and the stirring was continued at the same temperature for further 30 minutes. Then, while continuing the stirring, the mixture was gradually heated to 130° C. in 120 minutes, and the stirring was continued at the same temperature for 3 hours. The generation of hydrogen sulfide gas was terminated, and no substantial foaming was observed. 1221 parts of a viscous yellow polymer was obtained. The polymer thus obtained had an average molecular weight of 1800 (as measured by GPC) and a sulfur content of 33.6%.

EXAMPLE 12

48 Parts of EGTG, 209 parts of BDTG and 13.2 parts of PTMP were dissolved in 33 parts of mixed xylene and reacted with sulfur in the presence of 1.1 part of n-butylamine in the same manner as in Example 11, by gradually adding 70.8 parts of sulfur powder in 80 minutes, whereby 319 parts of a yellow rubber-like product was obtained in the same manner as in Example 11. The polymer thus obtained had an average molecular weight of 1500 and a sulfur content of 35.6%.

EXAMPLE 13

1043 Parts of BDTG and 18.4 parts of trimethylolethane trithioglycolate were dissolved in 136 parts of a mixed xylene solvent and reacted with sulfur powder in the presence of 4.5 parts of n-butylamine. The amount of the sulfur was 283.2 parts, and the time for the addition of the sulfur was 90 minutes.

Thus, 1235 parts of a viscous liquid polymer was obtained. The polymer thus obtained had an average molecular weight of 1900 and a sulfur content of 30.8%.

EXAMPLES 14 to 25

112.5 Parts of BDTG and 29 parts of sulfur powder were reacted in the same manner as in Example 11 except that the type and the amount of the catalyst and the final reaction temperature and the reaction time were varied as shown in Table 3, whereby sulfur-containing polymers were obtained. The yields of the polymers thus obtained are shown in Table 3.

TABLE 3

| Examples | Catalyst Type | Amount (parts) | Reaction Temperature (°C.) | Time (hours) | Yield (parts) |
|---|---|---|---|---|---|
| 14 | n-Butylamine | 1 | 130 | 1.5 | 128.2 |
| 15 | " | 0.1 | 130 | 8 | 127.0 |
| 16 | Urea | 5 | 140 | 20 | 132.1 |
| 17 | Hexamethylene-tetramine | 2 | 140 | 6 | 129.0 |
| 18 | Diphenyl-guanidine | 0.4 | 130 | 5 | 127.4 |
| 19 | 1,2,3-Tri-phenylguanidine | 1 | 130 | 5 | 128.0 |
| 20 | Zinc dimethyl-dithiocarbamate | 2 | 140 | 6 | 129.2 |
| 21 | p-Aminodi-phenylamine | 4 | 140 | 16 | 131.4 |
| 22 | Aniline | 4 | 140 | 20 | 131.2 |
| 23 | Dibutylamine | 1 | 130 | 3 | 128.4 |
| 24 | Ethylenediamine | 0.4 | 130 | 5 | 127.5 |
| 25 | Dimethyl-formamide | 1 | 140 | 20 | 128.2 |

We claim:

1. A sulfur-containing polymer, consisting essentially of:
repeating units of the formula:

$$\mathrm{+SR'COROCR'S}_p\mathrm{+} \qquad (I)$$
$$\phantom{+SR'}\|\phantom{ROC}\|$$
$$\phantom{+SR'}O\phantom{ROC}O$$

wherein R is a straight chain or branched chain alkylene group having from 1 to 6 carbons atoms, R' is a straight chain or branched chain alkylene group having from 1 to 3 carbon atoms and p is an integer of up to 10, said polymer having an average molecular weight as determined by gel permeation chromatography analysis of from 500 to 10,000 and a sulfur content of from 15 to 65% by weight.

2. A flame and smoke retardant comprising the sulfur-containing polymer as defined in claim 1.

3. A process for producing a sulfur-containing polymer, which consists essentially of reacting at least one member selected from the group consisting of dimercaptocarboxylic acid esters represented by the formula:

$$\mathrm{HSR'COROCR'SH} \qquad (II)$$
$$\phantom{HS}\|\phantom{ROC}\|$$
$$\phantom{HS}O\phantom{ROC}O$$

where R is a straight or branched alkylene group having from 1 to 6 carbon atoms, and R' is a straight or branched alkylene group having from 1 to 3 carbon atoms, with sulfur in contact with at least one nitrogen-containing compound catalyst selected from the group consisting of compounds having an amino group, a substituted amino group and a nitrogen-containing hetero ring.

4. A process for producing a sulfur-containing polymer, which comprises reacting at least one member selected from the group consisting of dimercaptocarboxylic acid esters represented by the formula:

$$\mathrm{HSR'COROCR'SH} \qquad (II)$$
$$\phantom{HS}\|\phantom{ROC}\|$$
$$\phantom{HS}O\phantom{ROC}O$$

where R is a straight or branched alkylene group having from 1 to 6 carbon atoms, and R' is a straight and branched alkylene group having from 1 to 3 carbon atoms, and at least one member selected from the group consisting of polymercaptocarboxylic acid esters represented by the formula:

$$\mathrm{R''_{4-m}-C(CH_2OCR'''SH)}_m \qquad (III)$$
$$\phantom{R''_{4-m}-C(CH_2O}\|$$
$$\phantom{R''_{4-m}-C(CH_2O}O$$

where R'' is a hydrogen atom, a methyl group or an ethyl group, R''' is a straight or branched alkylene group having from 1 to 3 carbon atoms, and m is an integer of 3 or 4, with sulfur in contact with at least one nitrogen-containing compound catalyst selected from the group consisting of compounds having an amino group, a substituted amino group and a nitrogen-containing hetero ring.

5. The process of claim 3, wherein the ratio of sulfur reactant to mercapto groups in the dimercaptocarboxylic acid ester compound ranges from 0.1 to 9.0:1.

6. The process of claim 3, wherein said catalyst is selected from the group consisting of urea compounds, thiourea compounds, nitrogen-containing heterocyclic compounds, guanidine compounds, thiocarbamate compounds, diarylamine compounds, aniline compounds, aliphatic primary amine compounds, aliphatic secondary amine compounds, aliphatic tertiary amine compounds, alicyclic amine compounds, diamine compounds, substituted alkyl diamine compounds, triamine compounds, polyamine compounds and oxyalkylene amine compounds.

7. The process of claim 3, wherein the amount of said catalyst ranges from 0.01 to 30% by weight of the starting dimercaptocarboxylic acid ester reactant.

8. The process of claim 3, wherein said reaction is conducted at a temperature of from 20 to 80° C.

9. The process of claim 4, wherein the amount of sulfur employed is such that the ratio of sulfur to mercapto groups in the two acid ester reactants ranges from 0.1 to 9.0:1.

10. The process of claim 4, wherein the amount of said polymercaptocarboxylic acid ester compound is at most 0.10 mole per 1 mole of said polymercaptocarboxylic acid ester compound.

11. The process of claim 4, wherein the amount of said catalyst present in said reaction mixture ranges from 0.01 to 30% by weight relative to the starting ester compounds.

12. The process of claim 4, wherein said reaction is conducted at a temperature of 20° to 80° C.

13. The process of claim 4, wherein said catalyst is selected from the group consisting of urea compounds, thiourea compounds, nitrogen-containing heterocyclic compounds, guanidine compounds, thiocarbamate compounds, diarylamine compounds, aniline compounds, aliphatic primary amine compounds, aliphatic secondary amine compounds, aliphatic tertiary amine compounds, alicyclic amine compounds, diamine compounds, substituted alkyl diamine compounds, triamine compounds, polyamine compounds and oxyalkylene amine compounds.

* * * * *